N. D. WALDEN.
LOCKING MECHANISM.
APPLICATION FILED NOV. 8, 1918.
1,305,955.
Patented June 3, 1919.
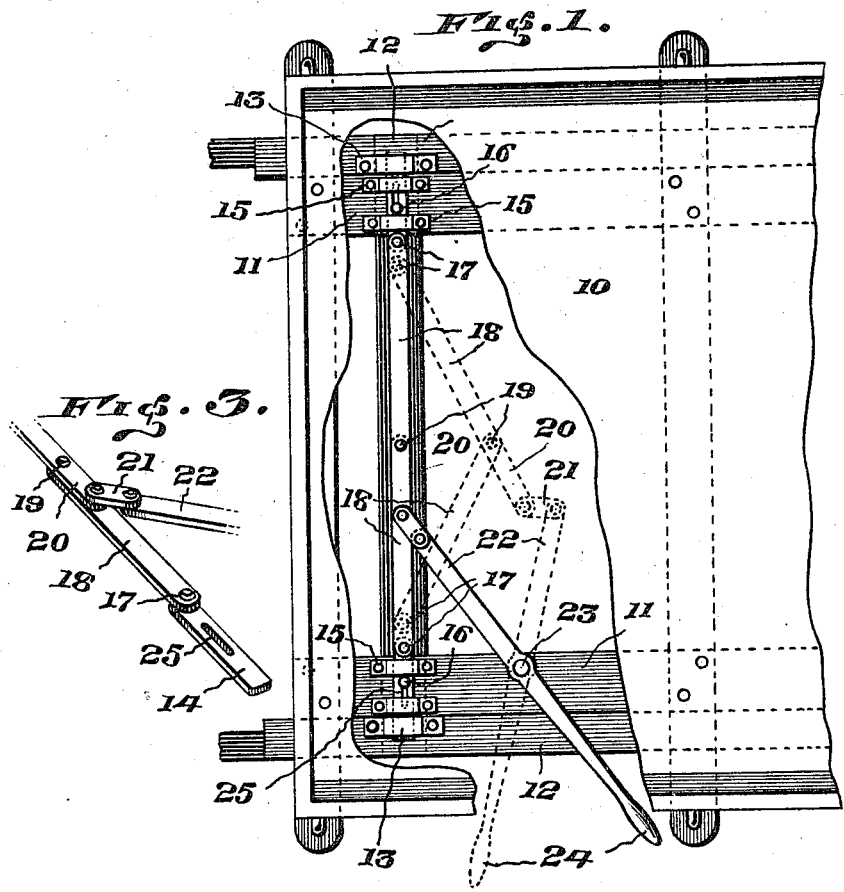
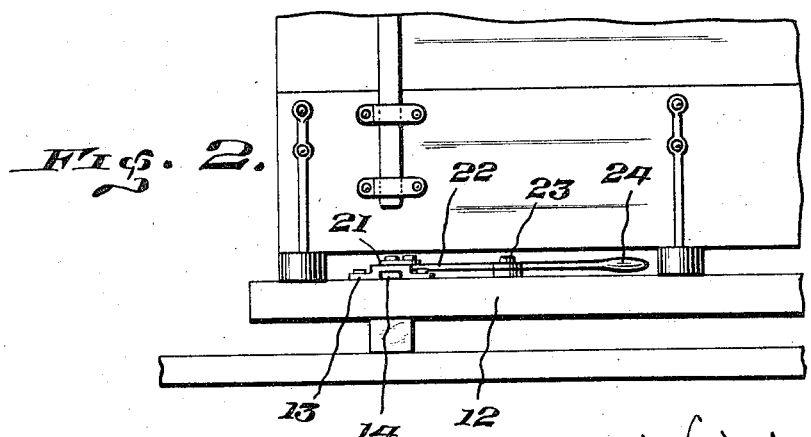

UNITED STATES PATENT OFFICE.

NATHAN D. WALDEN, OF DAVID CITY, NEBRASKA.

LOCKING MECHANISM.

1,305,955.     Specification of Letters Patent.     Patented June 3, 1919.

Original application filed June 25, 1918, Serial No. 241,859. Divided and this application filed November 8, 1918. Serial No. 261,613.

*To all whom it may concern:*

Be it known that I, NATHAN D. WALDEN, a citizen of the United States, residing at David City, in the county of Butler and State of Nebraska, have invented certain new and useful Improvements in Locking Mechanism; and I do hereby declare the following to be a full, clear, and exact description of the invention, such as will enable others skilled in the art to which it appertains to make and use the same.

This invention relates to a locking device and particularly to a construction adapted for application to dumping vehicles, and comprises a division of application filed June 25, 1918, Serial No. 241,859.

The invention has for an object to provide a novel and improved construction and arrangement of locking mechanism comprising oppositely extending bolts connected by a toggle lever, together with an operating lever provided with a link connection with an extended end of one member of the toggle.

Other and further objects and advantages of the invention will be hereinafter set forth and novel features thereof defined by the appended claim.

In the drawings:

Figure 1 is a top plan showing the invention applied to a wagon body;

Fig. 2 a side elevation thereof, and

Fig. 3 a detailed perspective of one end of the bolt operating mechanism.

Like numerals refer to like parts in the several figures of the drawings.

The invention may be applied to perform its locking function in any desired position but is here shown in connection with a dumping vehicle, although not confined to such use. In the application shown the locking mechanism is mounted upon a sill or beam 11 carried by the body portion 10 of the vehicle and this beam is disposed parallel with a fixed stringer 12 which carries keepers 13.

The bolts 14 at each end of the locking mechanism are mounted to reciprocate within guides or keepers 15 upon the beam 11 and are each longitudinally slotted as at 25 to ride upon and be guided by pins 16 by which their travel is limited. The inner end of these bolts is pivotally connected at 17 to each of the toggle members 18 which are pivoted together at 19 so as to reciprocate the bolts as the toggle joint is made or broken.

For the purpose of operating this toggle an extension 20 is provided from one of the members thereof and connected by link 21 with the inner end of a lever 22 pivoted upon the sill 11 at 23 near the corresponding bolt 14 and provided with the operating handle 24 extending beyond said bolt into convenient position at one side of the vehicle body. The link 21 is short, and when the lever 22 is swung so as to straighten out the toggle members 18, the link 21 and lever 22 will also move toward or into a straight line position, whereby should the toggle tend to break, this movement will be resisted by the link 21 and lever 22.

In the operation of the invention it will be seen that when the bolts are in the full line position of Fig. 1 they are positively held in locked relation with their keepers and cannot be accidentally released, while when the toggle joint is shifted laterally by the lever connection therewith these bolts will be reciprocated out of engagement with their keepers and the parts released so as to permit the convenient dumping of the wagon body when the device is applied to such a structure for which it is particularly adapted. The locking mechanism provides means by which the opposite bolts are simultaneously operated and securely held in locked or released position. The invention presents a simple and very efficient and economically constructed locking device.

What I claim is:

A locking mechanism including opposite sliding bolts, toggle members having a pivot joint and having their opposite ends pivoted to said bolts, an operating lever pivoted near one bolt, one toggle member having an extension projecting beyond the pivot joint, and a link connecting said extension and lever and swingable toward a straight line position with said lever when the lever is swung to move the toggle members toward a straight line position.

In testimony whereof I have signed my name to this specification in the presence of two subscribing witnesses.

NATHAN D. WALDEN.

Witnesses:
     CHARLEY SLEEGER,
     H. F. ANDERSON.

Copies of this patent may be obtained for five cents each, by addressing the "Commissioner of Patents, Washington, D. C."